United States Patent
Ou et al.

(10) Patent No.: US 9,253,555 B2
(45) Date of Patent: Feb. 2, 2016

(54) PORTABLE ELECTRONIC APPARATUS

(71) Applicant: HTC Corporation, Taoyuan County (TW)

(72) Inventors: Kuan-Ying Ou, Taoyuan Hsien (TW); Ching-Sheng Wang, Taoyuan Hsien (TW); Szu-Huang Wang, Taoyuan Hsien (TW); Chieh-Sheng Lin, Taoyuan Hsien (TW)

(73) Assignee: HTC Corporation, Taoyuan (TW)

( * ) Notice: Subject to any disclaimer, the term of this patent is extended or adjusted under 35 U.S.C. 154(b) by 151 days.

(21) Appl. No.: 14/182,301

(22) Filed: Feb. 18, 2014

(65) Prior Publication Data

US 2015/0237425 A1    Aug. 20, 2015

(51) Int. Cl.
*H04R 1/02*    (2006.01)
*G06F 1/16*    (2006.01)
*H04M 1/02*    (2006.01)
*H04R 1/06*    (2006.01)

(52) U.S. Cl.
CPC .............. *H04R 1/02* (2013.01); *G06F 1/1626* (2013.01); *H04M 1/0277* (2013.01); *H04R 1/06* (2013.01); *H04R 2499/11* (2013.01)

(58) Field of Classification Search
CPC ...... H04R 1/06; H04R 1/225; H04R 2499/11; H04R 9/06
USPC .......................................................... 381/334
See application file for complete search history.

(56) References Cited

U.S. PATENT DOCUMENTS

| | | | |
|---|---|---|---|
| 7,068,979 B2 * | 6/2006 | Pedersen ............... | H04M 1/035 379/430 |
| 7,336,228 B2 | 2/2008 | Lu et al. | |
| 7,369,674 B2 * | 5/2008 | Miura ..................... | H04R 9/10 381/396 |
| 7,787,618 B2 | 8/2010 | Jorgensen | |
| 8,009,850 B2 * | 8/2011 | Zhou ..................... | H04M 1/035 381/345 |
| 8,363,824 B2 | 1/2013 | Jorgensen | |
| 8,467,195 B2 * | 6/2013 | Zaitsu ................... | H04M 1/185 361/679.02 |
| 8,483,785 B2 * | 7/2013 | Yahagi .................. | H01Q 1/243 455/575.3 |
| 8,693,712 B2 * | 4/2014 | Sun ........................ | H04R 19/04 381/174 |
| 2013/0070947 A1 * | 3/2013 | Chien ................... | H04R 1/2803 381/332 |

FOREIGN PATENT DOCUMENTS

| | | |
|---|---|---|
| CN | 101416473 A | 4/2009 |
| CN | 101080876 B | 7/2012 |
| CN | 202364343 U | 8/2012 |
| CN | 103221896 A | 7/2013 |
| TW | M350195 U | 2/2009 |

OTHER PUBLICATIONS

Corresponding Taiwanese Office Action that these art references were cited.

* cited by examiner

*Primary Examiner* — Mark Blouin
(74) *Attorney, Agent, or Firm* — CKC & Partners Co., Ltd.

(57) ABSTRACT

A portable electronic apparatus includes a structural member, a sound member, a circuit board, and a frame. The structural member has an opening and an accommodating recess. The sound member is accommodated in the accommodating recess, and has a top surface, a bottom surface, and a sound outlet. The sound outlet is located at the top surface. The circuit board cover plates the opening and has a first through hole corresponding to the sound outlet. The circuit board is disposed between the frame and the structural member. The frame has a second through hole corresponding to the sound outlet. The sound member is electrically connected to the circuit board. The sound outlet is communicated with the first and second through holes.

20 Claims, 5 Drawing Sheets

PORTABLE ELECTRONIC APPARATUS

BACKGROUND

1. Technical Field

The present invention relates to a portable electronic apparatus, and more particularly, to the portable electronic apparatus having a sound box structure.

2. Description of Related Art

With the fast progress in technology, electronic products all are developed towards lightweight and compact design; especially, thinning design has become a mainstream in the present market of consumer electronic products.

The consumer electronic products, such as notebook computers, tablet computers, cell phones, PDAs, etc., now all need to have audio-video function to meet the consumers' requirements. In addition, because of the advantages of mobility, powerful capabilities of transmitting and processing data, and multimedia technology Integration, portable electronic apparatuses have become one of the most important electronic products. These kinds of the electronic products can play audio and video files with multimedia technology, show images by display modules, and output sounds by audio player modules (e.g., speakers), so as to achieve the purposes of communication and entertainment.

With more and more emphasis on audio-video performance, a portable electronic apparatus is equipped with more speakers. However, if the locations of the speakers and the sound field (i.e., the sound box structure) are not properly configured and designed, the speakers will be unable to achieve the desired effects and make the audio unnatural due to losing the spatial characteristics of the sound field. Even worse, the improper configuration of the speakers may deteriorate the performance in receiving signal of antennas.

SUMMARY

The invention provides a portable electronic apparatus. The portable electronic apparatus includes a first structural member, a first sound member, a first circuit board, and a frame. The first structural member has an opening and an accommodating recess. The first sound member is disposed in the accommodating recess and has a first top surface and a first bottom surface. The first sound member further has a first sound outlet located on the first top surface. The first circuit board covers the opening and has a first through hole corresponding to the first sound outlet. The first circuit board is disposed between the frame and the first structural member. The frame has a second through hole corresponding to the first sound outlet. The first sound member is electrically connected to the first circuit board. Sounds exit from the first sound outlet to the surroundings via the first through hole and the second through hole.

Accordingly, in at least one embodiment of the portable electronic apparatus of the invention, the circuit is disposed at the sound outlet of the sound member (i.e., at the front side of the sound member). As far as the portable electronic apparatus having the foregoing design is concerned, because the circuit board is not disposed between the sound member and a back cover (i.e., the rear side of the sound member), even if a sensitive antenna is disposed on the back cover, the distance between the circuit board and the antenna can effectively reduce the impact that the circuit board applies to the receiving signal quality of the antenna. Furthermore, the portable electronic apparatus of the invention includes a plurality of sound members, and the sound members can use the inner walls of the back cover (or structural members), sidewalls of the sound members, and the circuit board to form sound boxes.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
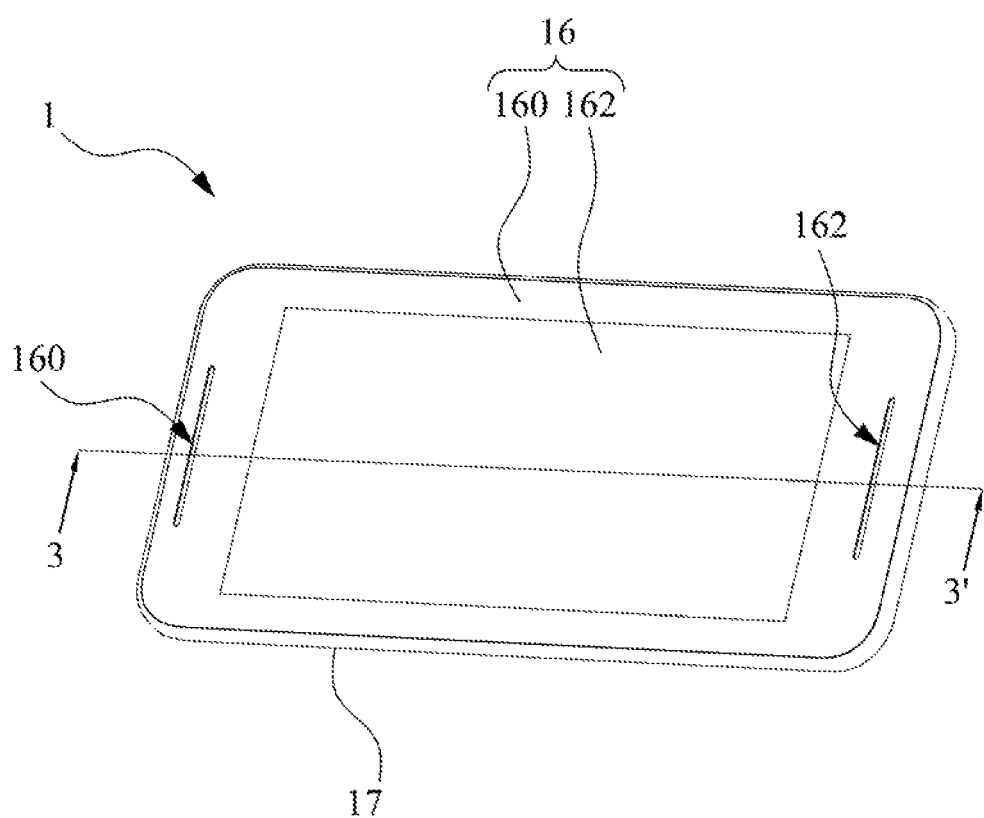
FIG. 1 is a perspective view of a portable electronic apparatus according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

Figure 2:
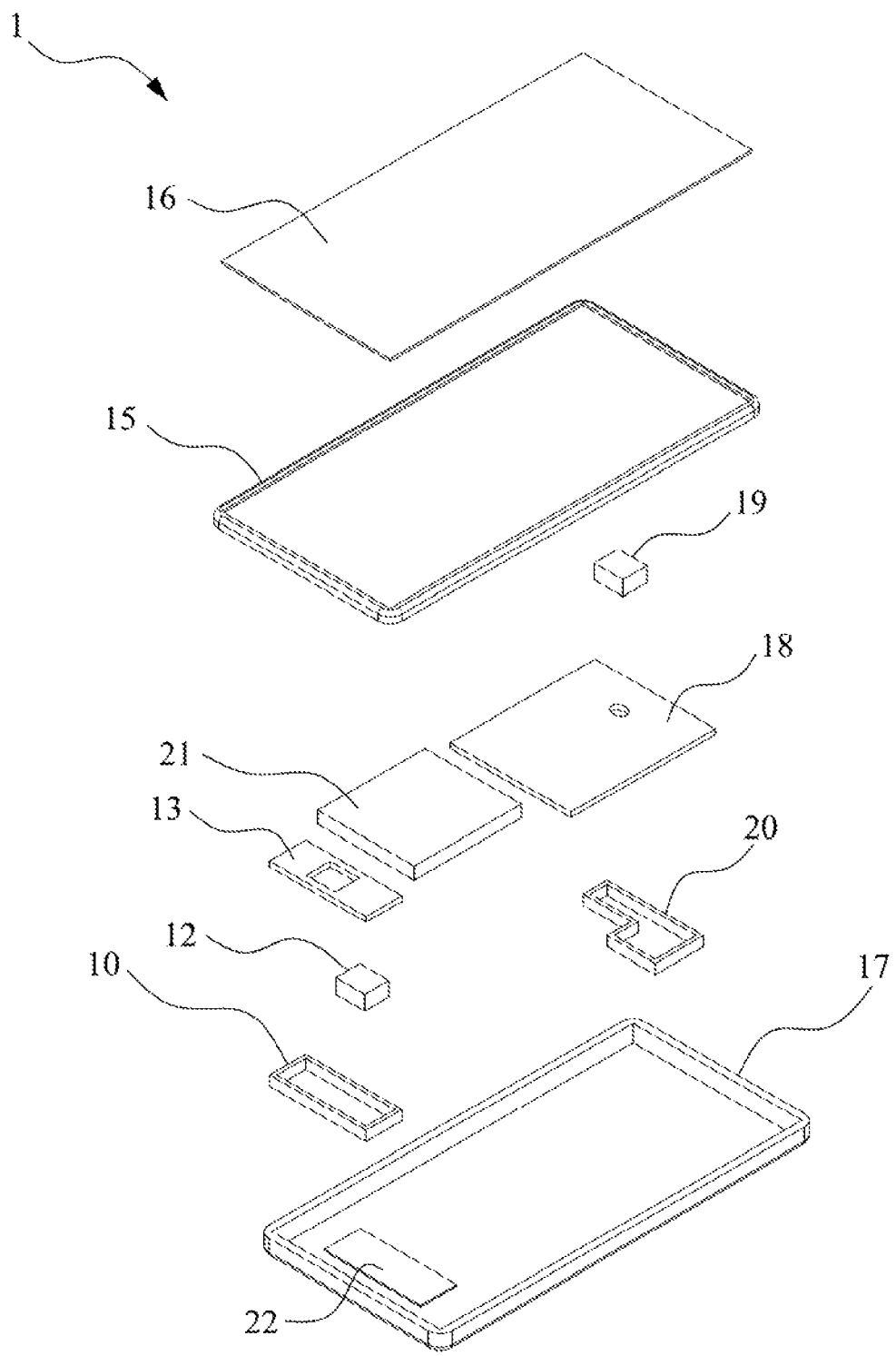
FIG. 2 is an exploded view of the portable electronic apparatus in FIG. 1.
Figure 3:
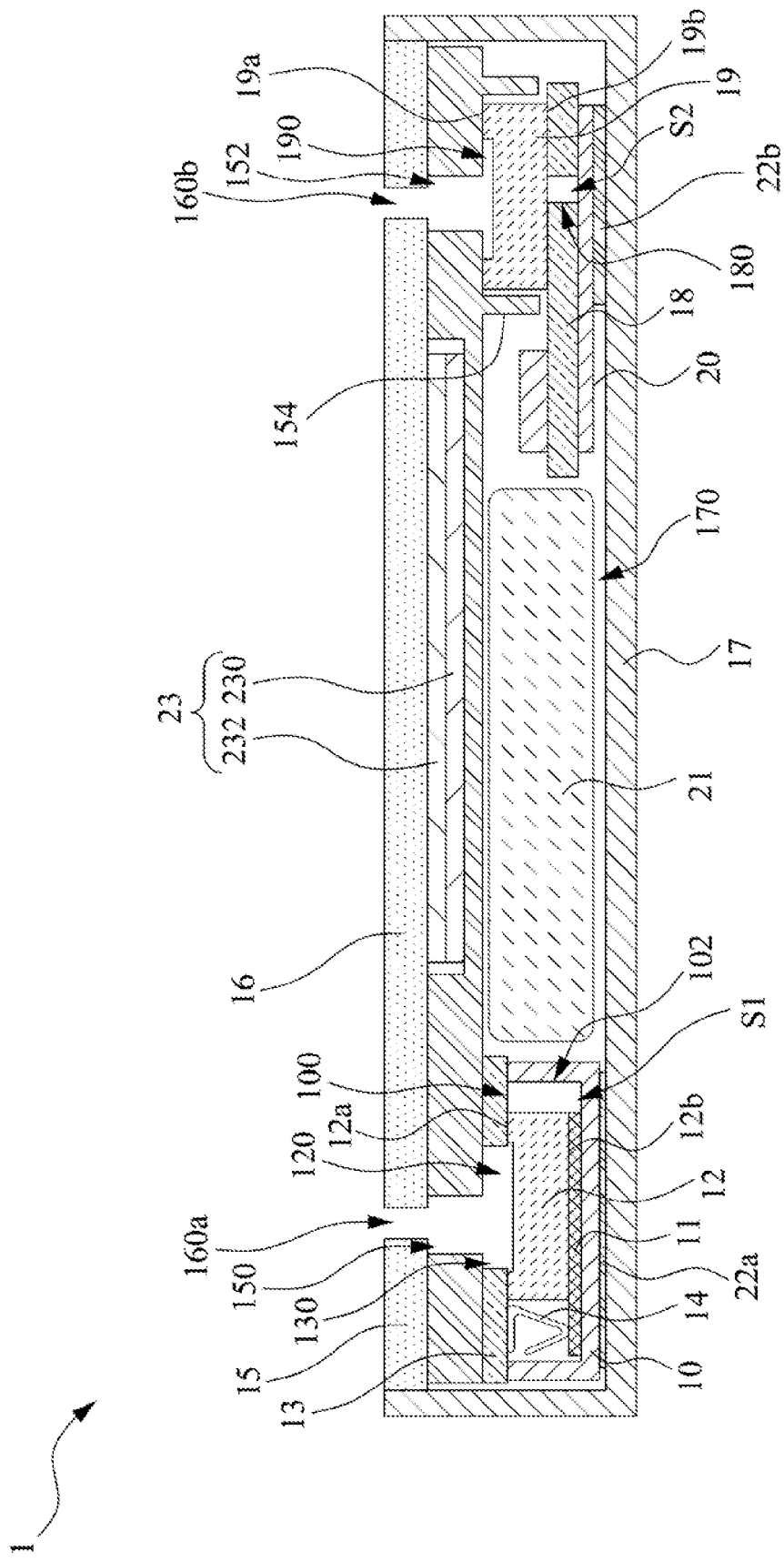
FIG. 3 is a cross-sectional view of the portable electronic apparatus in FIG. 1 along line 3-3'.

Referring to FIG. 1, FIG. 2, and FIG. 3. FIG. 1 is a perspective view of a portable electronic apparatus 1 according to an embodiment of the invention. FIG. 2 is an exploded view of the portable electronic apparatus 1 in FIG. 1. FIG. 3 is a cross-sectional view of the portable electronic apparatus 1 in FIG. 1 along line 3-3'.

As shown in FIG. 1, FIG. 2, and FIG. 3, in the present embodiment, the portable electronic apparatus 1 includes a first structural member 10, a first conductive member 11, a first sound member 12, a first circuit board 13, a second conductive member 14, a frame 15, a cover plate 16, a back cover 17, a second circuit board 18, a second sound member 19, a second structural member 20, a battery 21, a first antenna 22a, a second antenna 22b, and a display module 23. The display module 23 includes a LCD unit 230 and a touch unit 232. The back cover 17 can be assembled with the frame 15. The cover plate 16 includes a first sound hole 160a and a second sound hole 160b respectively located at the bottom and the top of the portable electronic apparatus 1. The portable electronic apparatus 1 is a smartphone for example, but the invention is not limited in this regard. The structures, functions of the foregoing components and the connection relationships among the components are described in detail below.

Figure 4A:
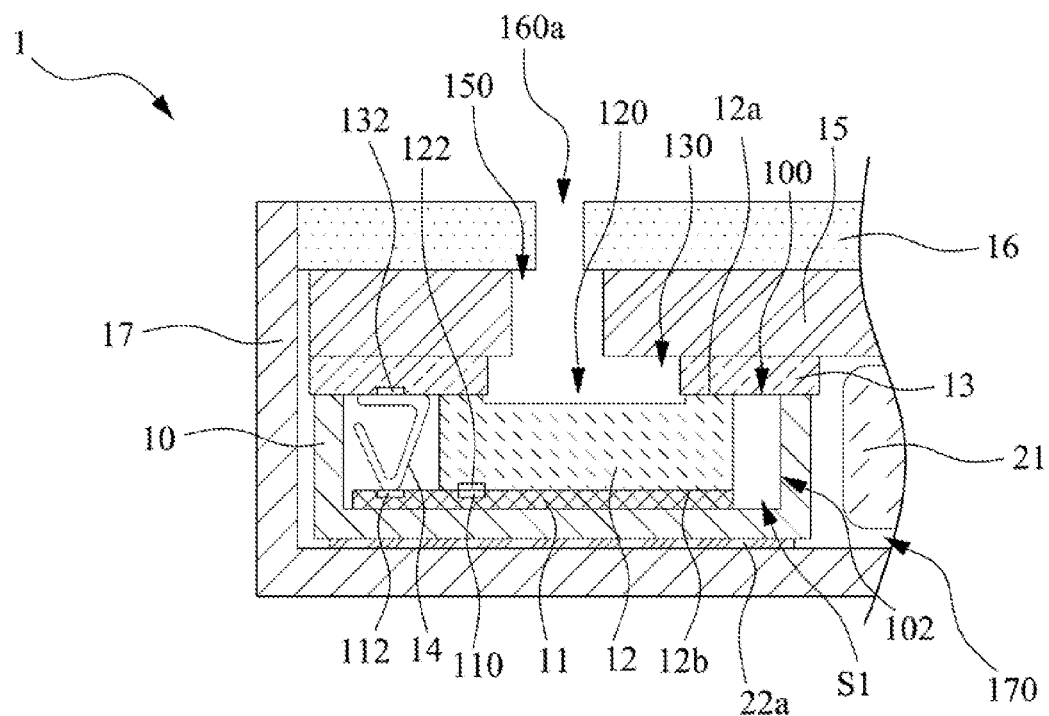
FIG. 4A is a partial view of FIG. 3.

Referring to FIG. 4A. FIG. 4A is a partial view of FIG. 3.

As shown in FIG. 3 and FIG. 4A, in the present embodiment, the frame 15 and the back cover 17 are assembled to form an accommodating space 170. The display module 23 of the portable electronic apparatus 1 is disposed at the upper side of the frame 15, and the cover plate 16 is attached with the frame 15 (i.e., the frame 15 is disposed between the first circuit board 13 and the cover plate 16). The LCD unit 230 of the display module 23 is disposed between the cover plate 16 and the frame 15, and the touch unit 232 is disposed a side of the display module 23 adjacent to the cover plate 16. The first structural member 10 of the portable electronic apparatus 1 is disposed in the accommodating space 170, and has an opening 100 and an accommodating recess 102. The first conductive member 11 of the portable electronic apparatus 1 is disposed in the accommodating recess 102 of the first structural member 10, and has a first conductive portion 110 and a second conductive portion 112. The first sound member 12 of the portable electronic apparatus 1 is disposed in the accommodating recess 102, and has a first top surface 12a and a first bottom surface 12b. The first sound member 12 further has a first sound outlet 120 and a first contact 122. The first sound outlet 120 and the first contact 122 are respectively located on the first top surface 12a and the first bottom surface 12b. The first conductive member 11 abuts against the first bottom surface 12b of the first sound member 12, so as to make the first contact 122 be electrically connected to the first conductive portion 110 of the first conductive member 11. The first circuit board 13 of the portable electronic apparatus 1 covers the opening 100 of the first structural member 10, is adjacent to the frame 15, and has first through hole 130 and a second contact 132. That is, the first circuit board 13 is disposed between the frame 15 and the first structural member 10. The second contact 132 of the first circuit board 13 faces the accommodating recess 102 of the first structural member 10. The second conductive member 14 of the portable electronic apparatus 1 is disposed in the accommodating recess 102. The second conductive member 14 is electrically coupled to the second contact 132 of the first circuit board 13 and electrically contacts the second conductive portion 112 of the first conductive member 11. The inner walls of the first structural member 10, the sidewalls of the first sound member 12, and the first circuit board 13 form a first sound box S1 of the first sound member 12.

Furthermore, the first top surface 12a of the first sound member 12 is adjacent to the first circuit board 13. The first through hole 130 of the first circuit board 13 corresponds to and is communicated with the first sound outlet 120 of the first sound member 12. In other words, the first circuit board 13 and the first sound member 12 seal the opening 100 of the first structural member 10, so as to seal the first sound box S1. Sounds of the first sound member 12 exit to the surroundings from the first sound outlet 120 via the first through hole 130 of the first circuit board 13.

As shown in FIG. 3 and FIG. 4A, in the present embodiment, the frame 15 of the portable electronic apparatus 1 has a second through hole 150. The first structural member 10, the first conductive member 11, the first sound member 12, the first circuit board 13, the second conductive member 14, and the frame 15 of the portable electronic apparatus 1 are accommodated in the accommodating space 170. The first sound outlet 120 of the first sound member 12, the first through hole 130 of the first circuit board 13, the second through hole 150 of the frame 15, and the first sound hole 160a of the cover plate 16 are communicated with each other. Therefore, the sounds of the first sound member 12 exit to the surroundings from the first sound outlet 120 sequentially via the first through hole 130 of the first circuit board 13, the second through hole 150 of the frame 15, and the first sound hole 160a of the cover plate 16. The first antenna 22a of the portable electronic apparatus 1 is disposed on the back cover 17, and an orthographic projection of the first sound member 12 on the back cover 17 overlaps at least a part of the first antenna 22a.

It should be pointed out that as far as the portable electronic apparatus 1 is concerned, by electrically connecting the first conductive member 11 and the second conductive member 14, the first circuit board 13 can be disposed at the first sound outlet 120 of the first sound member 12 (i.e., at the first top surface 12a of the first sound member 12) rather than between the first bottom surface 12b of the first sound member 12 and the back cover 17. Hence, even if the first antenna 22a is disposed at a place of the back cover 17 corresponding to the first sound member 12, the distance between the first circuit board 13 and the first antenna 22a can effectively reduce the impact that the first circuit board 13 applies to the receiving signal quality of the first antenna 22a.

In the present embodiment, the first conductive member 11 of the portable electronic apparatus 1 is a flexible printed circuit board, and the second conductive member 14 of the portable electronic apparatus 1 is a conductive elastic member. In an embodiment, the conductive elastic member is a metal spring plate, but the invention is not limited in this regard.

In the present embodiment, cushion layers (e.g., sound insulating sponges or adhesives) can be used to attach the first circuit board 13 with the first structural member 10 and attach the first circuit board 13 with the first top surface 12a, so as to seal the first sound box S1, but the invention is not limited in this regard.

Figure 4B:
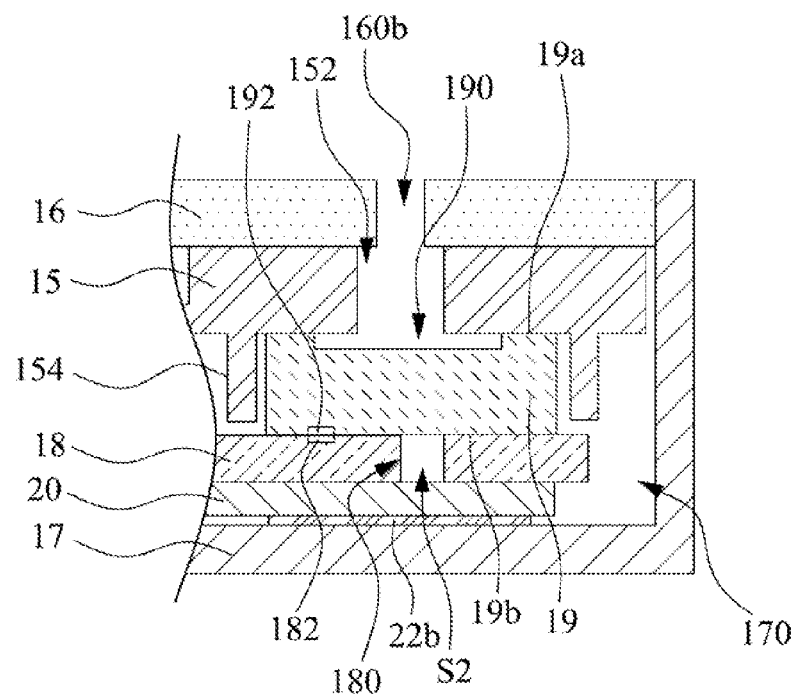
FIG. 4B is another partial view of FIG. 3.

Referring to FIG. 4B. FIG. 4B is another partial view of FIG. 3. As shown in FIG. 3 and FIG. 4B, in the present embodiment, the second sound member 19 of the portable electronic apparatus 1 has a second top surface 19a and a second bottom surface 19b. The second sound member 19 further has a second sound outlet 190 and a third contact 192. The second sound outlet 190 and the third contact 192 are respectively disposed on the second top surface 19a and the second bottom surface 19b. The second top surface 19a of the second sound member 19 is adjacent to the frame 15. The second circuit board 18 of the portable electronic apparatus 1 is adjacent to the second bottom surface 19b of the second sound member 19, and has a third through hole 180 and a fourth contact 182. The first circuit board 13 and the second circuit board 18 are respectively adjacent to two opposite sides of the battery 21. The third contact 192 of the second sound member 19 electrically contacts the fourth contact 182 of the second circuit board 18. The second structural member 20 and the second circuit board 18 of the portable electronic apparatus 1 are attached with each other. The second structural member 20, the second circuit board 18, and the second sound member 19 form a second sound box S2. As shown in FIG. 3, the battery 21 of the portable electronic apparatus 1 is accommodated in the accommodating space 170. The first circuit board 13 and the second circuit board 18 are respectively adjacent to two opposite sides of the battery 21, the first sound member 12 is electrically connected to the first circuit board 13, and the second sound member 19 is electrically connected to the second circuit board 18. In addition, the second antenna 22b of the portable electronic apparatus 1 is disposed on the back cover 17, and an orthographic projection of the second sound member 19 on the back cover 17 overlaps at least a part of the second antenna 22b.

Furthermore, the frame 15 of the portable electronic apparatus 1 further has a fourth through hole 152. The cover plate 16 further has a second sound hole 160b. The fourth through hole 152 of the frame 15 corresponds to and is communicated between the second sound outlet 190 of the second sound member 19 and the second sound hole 160b of the cover plate 16. The second sound outlet 190 of the second sound member 19 is located out of the second sound box S2. The sounds of the second sound member 19 exit to the surroundings from the second sound outlet 190 sequentially via the fourth through hole 152 and the second sound hole 160b of the cover plate 16.

Therefore, the portable electronic apparatus 1 of the present embodiment achieves the purpose that plural sound members (i.e., the first sound member 12 and the second sound member 19) effectively use the inner walls of the back cover 17 (or the first structural member 10 or the second structural member 20), sidewalls of the sound members, and the circuit boards (i.e., the first circuit board 13 and the second circuit board 18) to form sound boxes (i.e., the first sound box S1 and the second sound box S2).

In the present embodiment, cushion layers (e.g., sound insulating sponges or adhesives) can be used to attach the frame 15 with the second top surface 19a of the second sound member 19, attach the frame 15 with the cover plate 16, and attach edges of the cover plate 16 with the back cover 17, so as to seal the second sound box S2, but the invention is not limited in this regard.

In addition, in the present embodiment, the frame 15 of the portable electronic apparatus 1 further has at least one fixing structure 154. The fixing structure 154 of the frame 15 extends toward the second circuit board 18 and surrounds to fix the second sound member 19, so as to retain the second sound member 19. In appearance, the fixing structure 154 of the frame 15 is recess-shaped.

Figure 5:
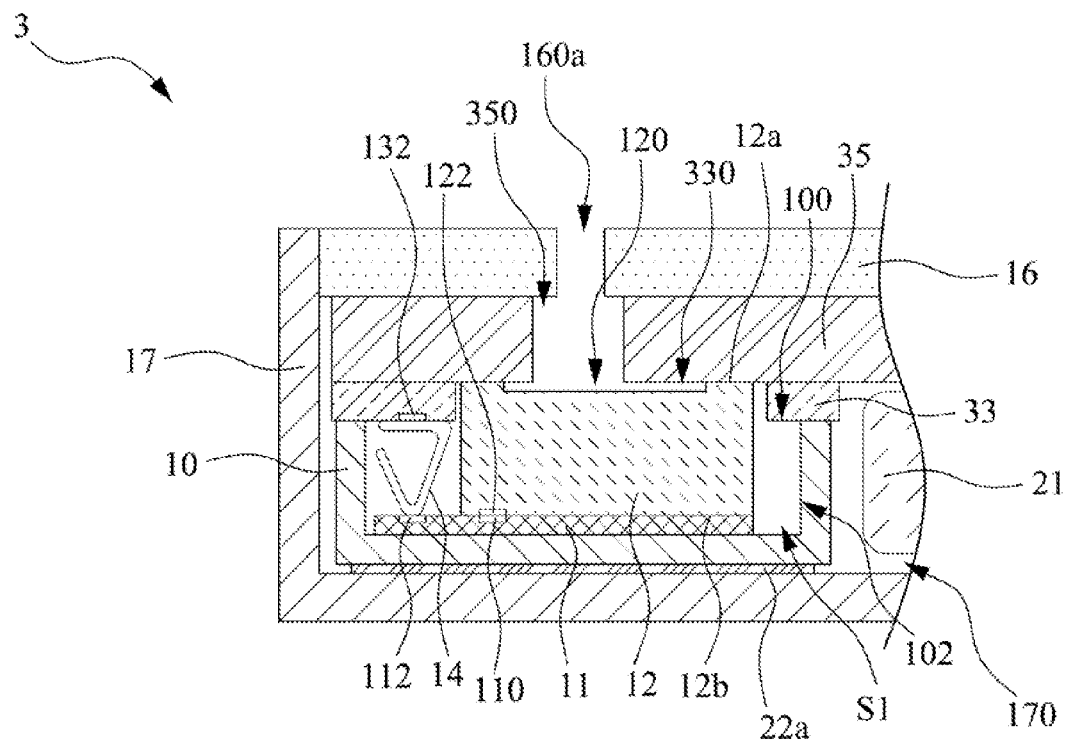
FIG. 5 is a partial cross-sectional view of a portable electronic apparatus according to another embodiment of the invention along line 3-3' in FIG. 1.

Referring FIG. 5. FIG. 5 is a partial cross-sectional view of a portable electronic apparatus 3 according to another embodiment of the invention along line 3-3' in FIG. 1.

As shown in FIG. 5, the first structural member 10, the first conductive member 11, the first sound member 12, the second conductive member 14, the cover plate 16, and the back cover 17 of the present embodiment are similar to those of the embodiment of FIG. 4A, so the structures and descriptions of the components can be referred to the foregoing related contents and are not recited again here. It should be pointed out that the difference between the present embodiment and the embodiment of FIG. 4A is that the present embodiment provides another structural configuration of a first circuit board 33 and a frame 35. In the present embodiment, the first sound member 12 is partially disposed in a first through hole 330 of the first circuit board 33, so as to make the first top surface 12a of the first sound member 12 be located within the inner edge of the first through hole 330 (i.e., the first sound member 12 is located within the inner edge of the first through hole 330), and the first top surface 12a is adjacent to the frame 15. A second through hole 350 of the frame 35 corresponds to and is communicated with the first sound outlet 120 of the first sound member 12, and the first sound hole 160a of the cover plate 16 is communicated with the second through hole 350 of the frame 35. Sounds of the first sound member 12 of the portable electronic apparatus 3 exit to the surroundings from the first sound outlet 120 sequentially via the second through hole 350 of the frame 35 and the first sound hole 160a of the cover plate 16. It can be seen that the inner walls of the first structural member 10, the sidewalls of the first sound member 12, the first circuit board 33, and the frame 35 form the first sound box S1. In other words, the first circuit board 33, the first sound member 12, and the frame 35 seal the opening 100 of the first structural member 10, so as to seal the first sound box S1, and the first sound outlet 120 of the first sound member 12 is located out of the first sound box S1.

In the present embodiment, cushion layers (e.g., sound insulating sponges or adhesives) can be used to attach the first circuit board 33 with the first structural member 10, attach the frame 35 with the first top surface 12a of the first sound member 12, and attach the frame 35 and the first circuit board 33, so as to seal the first sound box S1, but the invention is not limited in this regard.

Figure 6:
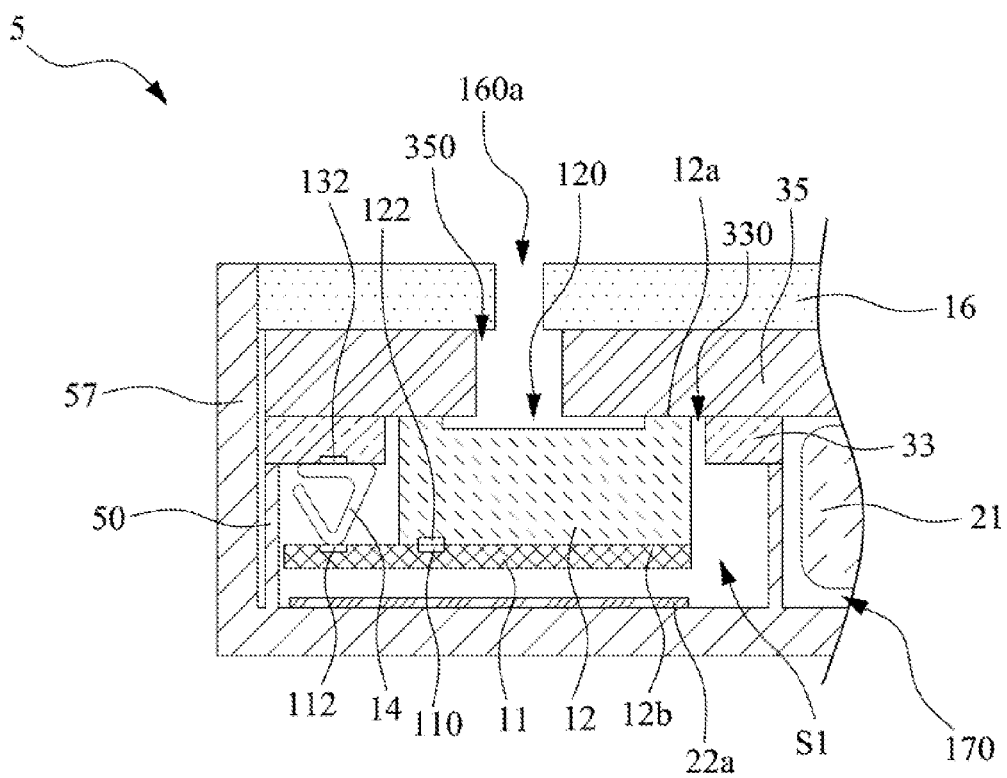
FIG. 6 is a partial cross-sectional view of a portable electronic apparatus according to further another embodiment of the invention along line 3-3'.

Referring to FIG. 6. FIG. 6 is a partial cross-sectional view of a portable electronic apparatus 5 according to further another embodiment of the invention along line 3-3' in FIG. 1.

As shown in FIG. 6, all components included in the present embodiment are similar to those of the embodiment of FIG. 5, so the structures and descriptions of the components can be referred to the foregoing related contents and are not recited again here. It should be pointed out that the difference between the present embodiment and the embodiment of FIG. 5 is that a back cover 57 and the first structural member 50 of the present embodiment are integrally formed. In other words, in the present embodiment, the first structural member 50 integrally formed with the back cover 56, the cover plate 16, the frame 35, the sidewalls of the first sound member 12, and the first circuit board 33 form the first sound box S1.

According to the foregoing recitations of the embodiments of the invention, it can be seen that in at least one embodiment of the portable electronic apparatus of the invention, the circuit is disposed at the sound outlet of the sound member (i.e., at the front side of the sound member). As far as the portable electronic apparatus having the foregoing design is concerned, because the circuit board is not disposed between the sound member and a back cover (i.e., the rear side of the sound member), even if a sensitive antenna is disposed on the back cover, the distance between the circuit board and the antenna can effectively reduce the impact that the circuit board applies to the receiving signal quality of the antenna. Furthermore, the portable electronic apparatus of the invention includes a plurality of sound members, and the sound members can use the inner walls of the back cover (or structural members), sidewalls of the sound members, and the circuit board to form sound boxes.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover plate modifications and variations of this invention provided they fall within the scope of the following claims.

What is claimed is:

1. A portable electronic apparatus, comprising:
   a first structural member having an opening and an accommodating recess;
   a first sound member disposed in the accommodating recess and having a first top surface and a first bottom surface, the first sound member further having a first sound outlet located on the first top surface;
   a first circuit board covering the opening and having a first through hole corresponding to the first sound outlet;
   a frame, wherein the first circuit board is disposed between the frame and the first structural member, and the frame has a second through hole corresponding to the first sound outlet; and
   a cover plate having a first sound hole, wherein the frame is disposed between the first circuit board and the cover plate, wherein the first sound member is electrically connected to the first circuit board, and sounds exit from the first sound outlet via the first through hole and the second through hole.

2. The portable electronic apparatus of claim 1, further comprising:
    a first conductive member disposed in the accommodating recess and having a first conductive portion and a second conductive portion, wherein the first sound member further has a first contact located on the first bottom surface, the first conductive member is adjacent to the first bottom surface, and the first contact electrically contacts the first conductive portion; and
    a second conductive member disposed in the accommodating recess and electrically contacting the second conductive portion, wherein the first circuit board further comprises a second contact, and the second conductive member is electrically coupled to the second contact.

3. The portable electronic apparatus of claim 1, wherein the first top surface is adjacent to the first circuit board, and the first through hole corresponds to and is communicated with the first sound outlet.

4. The portable electronic apparatus of claim 1, wherein the first sound outlet, the first through hole, the second through hole, and the first sound hole are communicated with each other.

5. The portable electronic apparatus of claim 1, wherein the first sound member is partially disposed in the first through hole, the first top surface is adjacent to the frame, and the second through hole corresponds to and is communicated with the first sound outlet.

6. The portable electronic apparatus of claim 5, the first sound outlet, the second through hole, and the first sound hole are communicated with each other.

7. The portable electronic apparatus of claim 1, wherein the first structural member, the first circuit board, and the first sound member form a first sound box.

8. The portable electronic apparatus of claim 1, further comprising a back cover having an accommodating space for accommodating the first structural member, the first sound member, the first circuit board, and the frame.

9. The portable electronic apparatus of claim 8, wherein the back cover and the first structural member are integrally formed.

10. The portable electronic apparatus of claim 8, further comprising a first antenna disposed on the back cover, wherein an orthographic projection of the first sound member on the back cover overlaps at least a part of the first antenna.

11. The portable electronic apparatus of claim 1, further comprising:
    a second sound member having a second top surface and a second bottom surface, the second sound member further having a second sound outlet and a third contact respectively located on the second top surface and the second bottom surface, wherein the second top surface is adjacent to the frame;
    a second circuit board adjacent to the second bottom surface and having a third through hole and a fourth contact, wherein the fourth contact electrically contacts the third contact; and
    a second structural member attached with the second circuit board, wherein the second structural member, the second circuit board, and the second sound member form a second sound box.

12. The electronic apparatus of claim 11, further comprising a cover plate having a second sound hole, the frame further having a fourth through hole communicated between the second sound outlet and the second sound hole.

13. The electronic apparatus of claim 12, further comprising a back cover assembled with the cover plate to form an accommodating space, wherein the frame, the second sound member, the second circuit board, and the second structural member are accommodated in the accommodating space.

14. The electronic apparatus of claim 13, further comprising:
    a battery disposed in the accommodating space, wherein the first circuit board and the second circuit board are respectively connected to two opposite sides of the battery, the first sound member is electrically connected to the first circuit board, and the second sound member is electrically connected to the second circuit board.

15. The electronic apparatus of claim 14, further comprising a display module disposed at a side of the frame opposite to the accommodating space and abutting against the frame.

16. The electronic apparatus of claim 15, wherein the display module comprises:
    a LCD unit disposed between the cover plate and the frame.

17. The electronic apparatus of claim 15, wherein the display module comprises:
    a touch unit disposed at a side of the cover plate adjacent to the display module.

18. The electronic apparatus of claim 14, further comprising a second antenna disposed on the back cover, wherein an orthographic projection of the second sound member on the back cover overlaps at least a part of the second antenna.

19. The electronic apparatus of claim 12, wherein the frame has a fixing structure extending toward the second circuit board, and surrounding to fix the second sound member.

20. The electronic apparatus of claim 1, wherein the first conductive member is a flexible printed circuit board, the second conductive member is a conductive elastic member, and the conductive elastic member is a metal spring plate.

* * * * *